Nov. 24, 1942.　　　A. H. KEMPER　　　2,302,776

STEERING GEAR BOOSTER

Filed April 23, 1941　　　2 Sheets-Sheet 1

Inventor

ALBERT H. KEMPER.

By Clarence A. O'Brien

Attorney

Nov. 24, 1942.   A. H. KEMPER   2,302,776
STEERING GEAR BOOSTER
Filed April 23, 1941   2 Sheets-Sheet 2

Inventor
ALBERT H. KEMPER.

By *Clarence A. O'Brien*

Attorney

Patented Nov. 24, 1942

2,302,776

UNITED STATES PATENT OFFICE 2,302,776

STEERING GEAR BOOSTER

Albert H. Kemper, Dayton, Ohio

Application April 23, 1941, Serial No. 389,971

1 Claim. (Cl. 74—498)

This invention relates to new and useful improvements in steering gear and more particularly to a booster for installation between the usual steering wheel and steering column.

The principal object of the present invention is to provide a booster which will provide an increased ratio of drive between the steering wheel and steering column, to the end that a slight turn of the steering wheel will have a graduated movement in the steering column and the balance of the steering gear.

Other objects and advantages of the invention will become apparent to the reader of the following specification.

Figure 1:
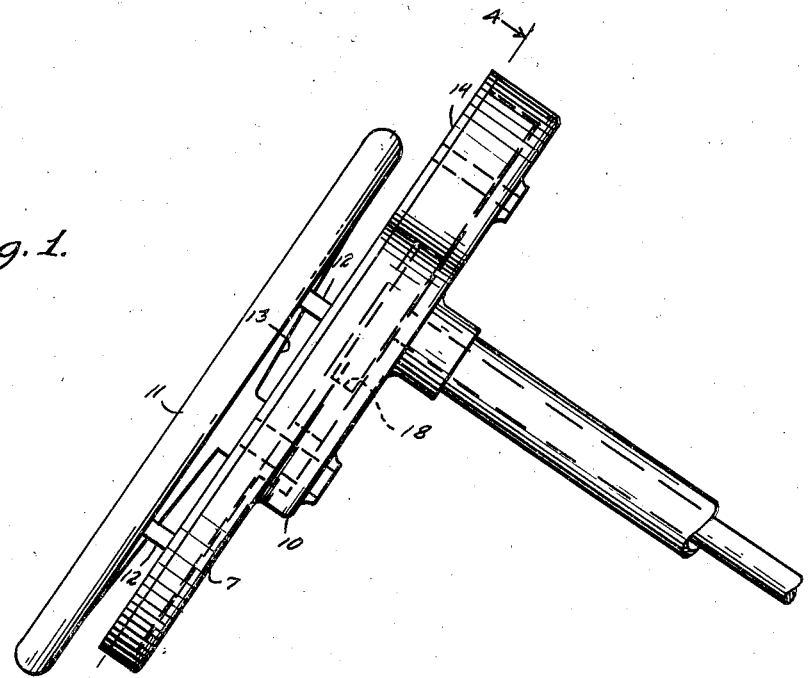
Figure 1 represents a fragmentary side elevational view.
Figure 2:
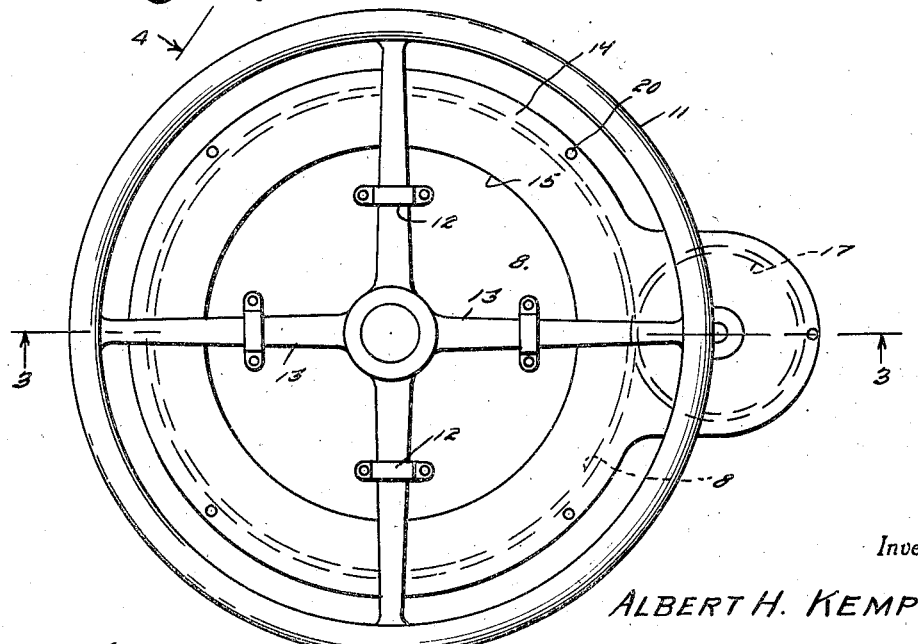
Figure 2 is a top plan view.
Figure 3:
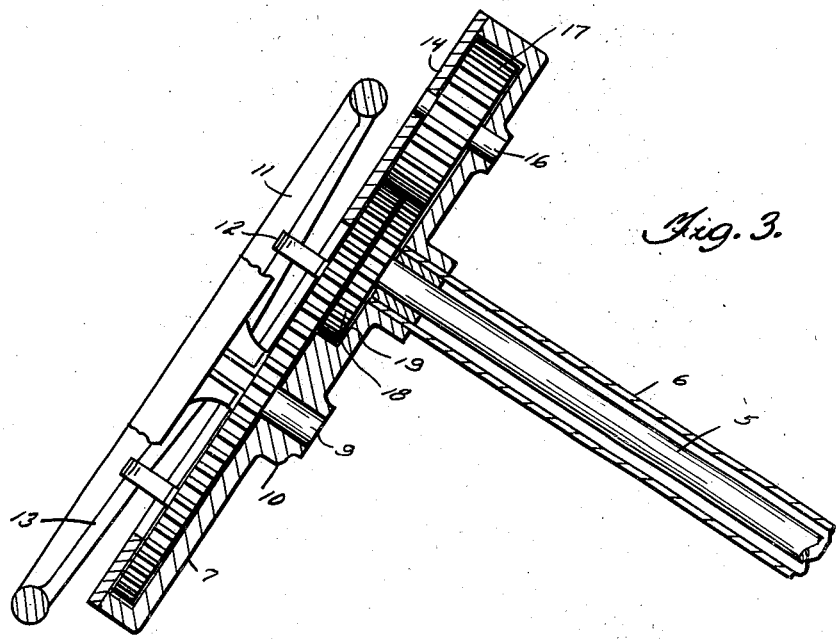
Figure 3 is a sectional view taken substantially on the line 3—3 of Figure 2.
Figure 4:
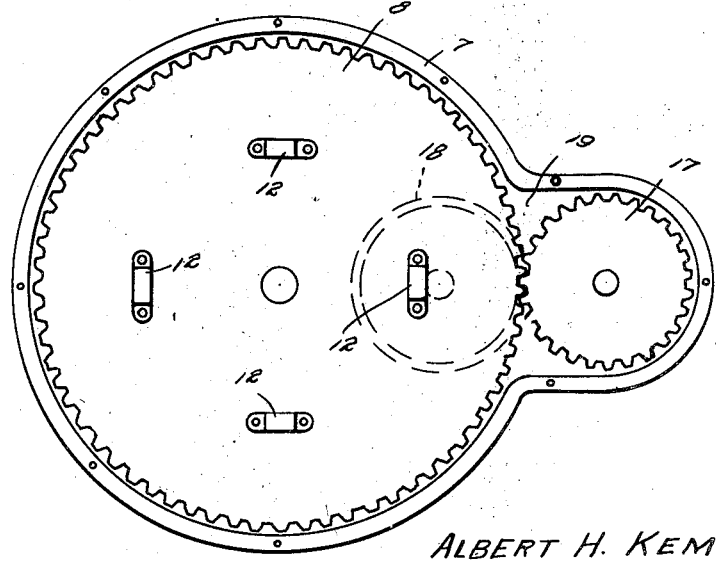
Figure 4 is a sectional view taken substantially on the line 4—4 of Figure 1.

Referring to the drawings wherein like numerals designate like parts, it can be seen that numeral 5 denotes a steering column having a stationary housing 6. Extending at right angles to the housing 6 and at the upper end thereof is a gear case 7. In the large part of this gear case 7 is located a gear 8 which has a stub shaft 9 journaled in a thickened portion 10 of the case 7. To this gear 8 is secured a steering wheel 11 by U-clamps 12 passing over the spokes 13 of the wheel 11.

The case 7 has a cover plate 17 and this cover plate has a substantially large opening 15 therein through which the U-clamps 12 extend to connect the wheel 11 with the gear 8.

Secured to a shaft 16 which has its ends journaled in the bottom of the case 7 and in the cover plate 14 is a pinion 17, which not only meshes with the gear 8 but also with a thinner pinion 18 located under a portion of the gear 8 and being suitably secured to the upper end of the steering column 5. The gear 18 is located in a shallow pocket 19 in the bottom of the case 7 into which pocket a portion of the thicker pinion 17 extends.

The cover plate 14 is secured to the case 7 by suitable securing means 20.

Obviously, upon turning of the wheel 11, the thick pinion 17 will be rotated and the thin pinion 18, in turn, will rotate the shaft 5 to an increase in comparison to the movement of the steering wheel 11.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a steering apparatus including a steering wheel and a steering column, gear means between the wheel and column, said gear means comprising a large gear for attachment to the steering wheel and a pinion for attachment to the steering column, and clamp members on the large gear for engagement with the usual spokes of the steering wheel.

ALBERT H. KEMPER.